US007059353B2

(12) United States Patent
Muscat et al.

(10) Patent No.: US 7,059,353 B2
(45) Date of Patent: Jun. 13, 2006

(54) POWER STEERING NOISE AND VIBRATION ATTENUATOR

(75) Inventors: Brian Muscat, LaSalle (CA); G. Michael Wooley, Grosse Pointe Woods, MI (US)

(73) Assignees: DaimlerChrysler Corporation, Auburn Hills, MI (US); Eaton Corporation, Cleveland, OH (US)

( * ) Notice: Subject to any disclaimer, the term of this patent is extended or adjusted under 35 U.S.C. 154(b) by 0 days.

(21) Appl. No.: 10/617,062

(22) Filed: Jul. 10, 2003

(65) Prior Publication Data

US 2005/0005982 A1 Jan. 13, 2005

(51) Int. Cl.
*F16L 55/04* (2006.01)

(52) U.S. Cl. ........................................ 138/26; 138/106

(58) Field of Classification Search .................. 138/26, 138/28, 110, 151, 106

See application file for complete search history.

(56) References Cited

U.S. PATENT DOCUMENTS 1,435,311 A * 11/1922 Knight ....................... 138/110
3,334,197 A * 8/1967 Boden et al. ................. 191/40
3,370,815 A * 2/1968 Opperthauser ............. 248/74.2
3,447,570 A * 6/1969 Collins ....................... 138/103
3,924,661 A * 12/1975 Bornhoffer .................. 138/110
4,611,633 A * 9/1986 Buchholz et al. ............. 138/26
4,927,103 A * 5/1990 Nicholson .................... 248/62
4,934,635 A * 6/1990 Sherman .................... 248/74.1
4,967,799 A * 11/1990 Bradshaw et al. .......... 138/121
5,094,271 A * 3/1992 Fritz et al. .................... 138/30
5,495,711 A * 3/1996 Kalkman et al. ............. 60/469
5,984,243 A * 11/1999 Pfaller et al. .............. 248/74.1
6,155,378 A * 12/2000 Qatu et al. .................. 181/255
RE37,279 E * 7/2001 Fisher et al. ................ 138/156
6,467,507 B1 * 10/2002 Engle ......................... 138/112
6,682,025 B1 * 1/2004 Turner et al. ................. 248/65
6,688,423 B1 * 2/2004 Beatty et al. ............... 181/207
2002/0092576 A1 * 7/2002 Miller ........................ 138/106

* cited by examiner

*Primary Examiner*—James Hook
(74) *Attorney, Agent, or Firm*—Ralph E. Smith

(57) ABSTRACT

A noise and vibration attenuator for a power steering hose is disposed on the flexible tubular portion of the hose. The damper is operable to attenuate noise or vibration found in the hose and includes a cylindrical main body having a central bore on the longitudinal axis of the main body. The bore is operable to receive the flexible tubular portion of the hose and fix the position of the damper on the hose. The main body can include a slot formed through the main body to the bore, operable to provide clearance for the hose member to be inserted from the side of the cylinder into the bore. The main body can also be solid, requiring that the hose be inserted into the bore in a longitudinal direction.

17 Claims, 4 Drawing Sheets

50 10 42 40 18 22 58 56 68 64 12 20 52 60 62 54 66

POWER STEERING NOISE AND VIBRATION ATTENUATOR

FIELD OF THE INVENTION

The present invention relates to mass dampers, and more particularly, to a mass damper for use in a hydraulic power steering system.

BACKGROUND OF THE INVENTION

In vehicle design, meeting noise and vibration requirements is increasingly important. In meeting both requirements, the design, placement, and operation of engine components in the engine compartment of a vehicle plays a significant role.

Generally speaking, components disposed in an engine compartment of a vehicle are subject to vibrational forces created by the engine and movement of a vehicle. For components such as hydraulic power steering hoses and the like, additional vibrational forces are created due to the pressure pulses and movement of hydraulic fluid within the system. Such additional vibrational forces can cause components to vibrate, rattle or squeak, thereby increasing passenger compartment noise and reducing occupant comfort.

In an effort to improve occupant comfort and reduce passenger and engine compartment noise, conventional damping systems have attempted to offset hydraulic noise through the use of tuning cables and restrictors. Tuning cables generally extend the length of a hydraulic hose and are specific to a particular hydraulic system. Specifically, conventional systems commonly include an elongate, wire wound cable, formed integrally with, or attached to, a hydraulic line and are operable to obviate the noise created by pressure pulses and/or moving fluid within the line. In essence, tuning cables serve to absorb the vibrational force created by the pressure pulses and moving hydraulic fluid and reduce the associated noise. While such systems effectively absorb vibrational forces created by pressure pulses and fluid movement, they fail to offset the additional vibrational forces caused by structural vibration.

Structural vibration is generally initiated by components disposed within an engine compartment of a vehicle. Such vibration generally transmits to a passenger compartment of the vehicle via systems that extend between the engine and passenger compartments. In one example, a hydraulic power steering system includes at least one hydraulic line which is attached at a first end to the engine compartment of a vehicle and at a second end at the hydraulic steering system. As previously discussed, an engine compartment of a vehicle experiences vibrational forces due to the movement of the vehicle and operation of the engine. In this regard, the first end of the hydraulic line, which is attached at the engine compartment, is subject to vibrational forces. As can be appreciated, the vibrational forces imparted on the first end of the hydraulic line tends to transfer from the attachment point to the line itself. Such structural vibration can cause the line to transmit vibration into the passenger compartment of the vehicle and create noise.

Therefore, a mass damper that is operable to absorb vibrational forces caused by both structural and fluid forces is desirable in the industry. Further, a mass damper that is capable of being tuned for different systems, thereby being easily transferable between different fluid lines and different systems, is desirable in the industry.

SUMMARY OF THE INVENTION

The present invention provides a power steering hose including a hose member having a first and second end and a damper disposed on the hose member. The damper is operable to attenuate noise or vibration between the first and second ends of the hose member and includes a cylindrical main body having a longitudinal axis and a bore formed in the main body. The bore is formed along the longitudinal axis of the main body and is operable to receive the hose member to fixedly attach the damper to the hose. The main body further includes a slot formed between an outer surface of the main body and the bore. The slot is operable to provide clearance for the hose member, thereby allowing the hose member to engage the bore.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
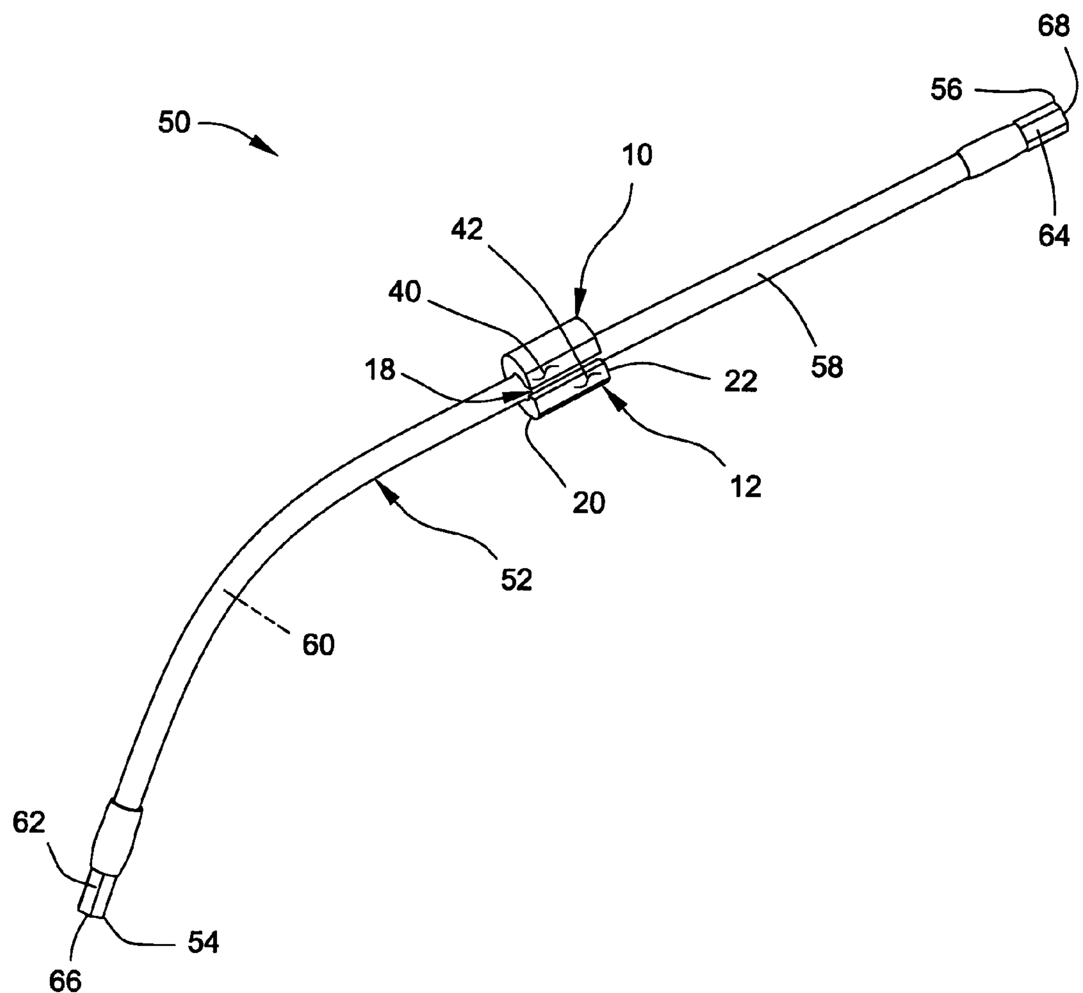
FIG. 1 is a perspective view of a power steering hose and damper assembly in accordance with the principles of the present invention.

The following description of the preferred embodiments is merely exemplary in nature and is in no way intended to limit the invention, its application, or uses.

With reference to the figures, a mass damper 10 is provided for use in attenuating and reducing vibrational noise. Mass damper 10 comprises a main body 12 having a longitudinal axis 14, a bore 16 formed along the longitudinal axis 14, and a slot 18 formed in the main body 12.

Figure 2:
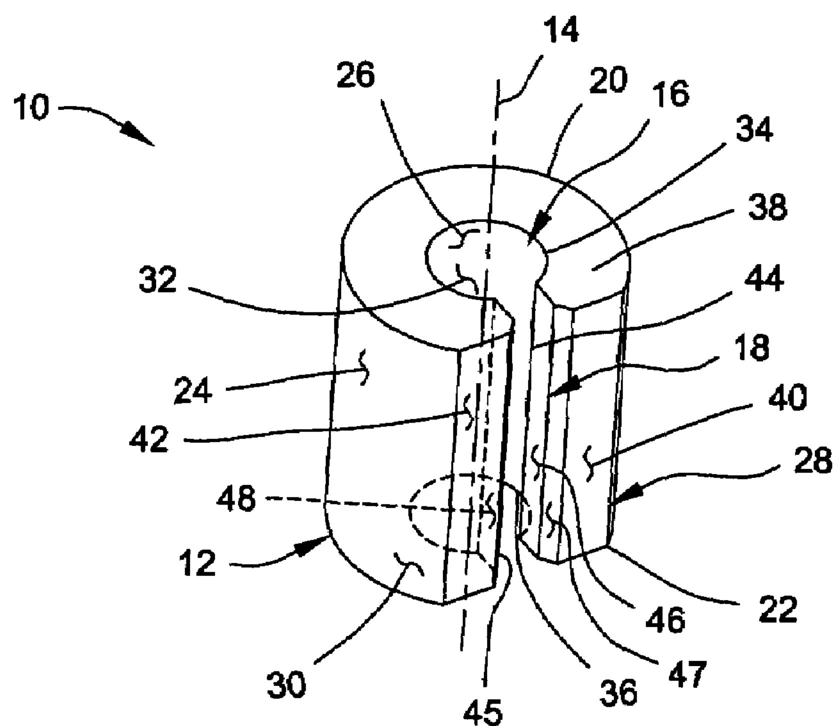
FIG. 2 is a perspective view of a damper in accordance with the principles of the present invention.
Figure 3:
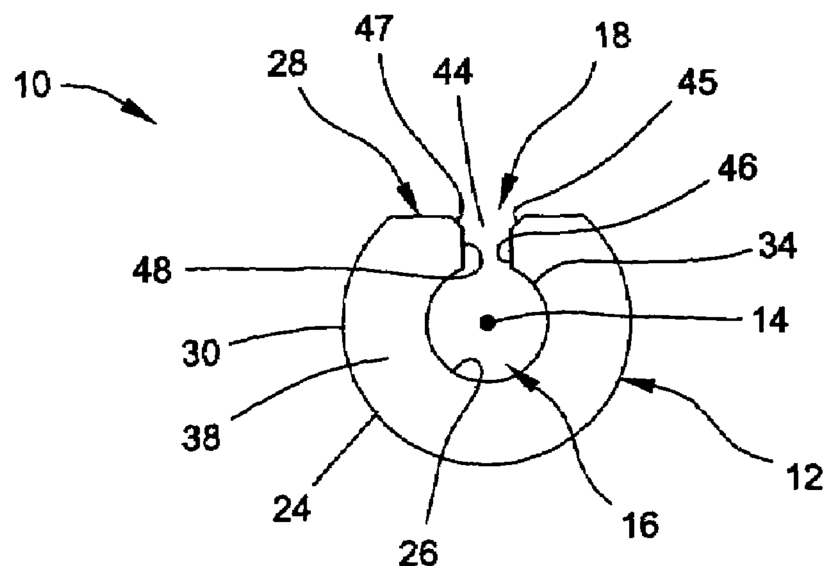
FIG. 3 is a plan view of the damper of FIG. 2.

With particular reference to FIGS. 2 and 3, the main body 12 is shown to include a generally cylindrical shape having a first end 20, a second end 22, an outer surface 24, an inner surface 26, and a planar surface 28. The first and second ends 20, 22 are formed on opposite ends of the main body 12 and generally define an overall length of the main body 12. The longitudinal axis 14 extends in a direction between the first and second ends 20, 22 and is formed generally at the midpoint of both the main body 12 and bore 16. While a cylindrical shape is disclosed, it should be understood that the main body 12 could comprise any suitable shape, such as, but not limited to, square or rectangular, and should be considered within the scope of the invention. While the main body 12 is described as having a generally cylindrical shape, it should be understood that the shape and overall mass of the main body 12 is dictated by the particular application and system in which the mass damper 10 is used.

The outer surface 24 and inner surface 26 each extend between the first and second ends 20, 22 of the main body 12, as best shown in FIG. 2. The outer surface 24 includes a generally arcuate surface 30 forming an outer diameter of the main body 12 while the inner surface 26 similarly comprises an arcuate surface 32 and forms an inner diameter of the main body 12.

The bore 16 is formed through the main body 12 and extends between the first and second ends 20, 22 along the longitudinal axis 14 such that a first circular opening 34 is formed on the first end 20 and a second circular opening 36 is formed on the second end 22. As can be appreciated, the circular openings 34, 36 define the overall diameter of the bore 16 and are generally formed coaxially with the longitudinal axis 14. In this manner, the bore 16 serves to define the inner limit of a thick-walled cylinder body wall 38, a thickness of which is generally defined between the outer surface 24 and inner surface 26 of the main body 12.

With particular reference to FIG. 2, the planar surface 28 is shown to include a first surface 40 and a second surface 42. The first and second surfaces 40, 42 are formed in the outer surface 24 of the main body 12 and are formed such that the first surface 40 is generally co-planar with the second surface 42.

The slot 18 is formed in the main body 12 generally along the longitudinal axis 14 and extends between the first and second ends 20, 22. The slot 18 is formed through the wall 38 of the main body 12 and is disposed generally between the first and second surfaces 40, 42 of the planar surface 28. The slot 18 extends from the first and second surfaces 40, 42 and terminates at the inner surface 26 such that an opening 44 to the bore 16 is formed in the main body 12 having a pair of chamfered surfaces 45, 47. The formation of the slot 18 creates a first and second walled surface 46, 48 formed in the wall 38 of the housing 12, whereby the first and second walled surface 46, 48 are formed generally perpendicular to the first and second surfaces 40, 42 of the planar surface 28. As best shown in FIG. 3, the width of the slot 18, as measured from the first walled surface 46 to the second walled surface 48, is generally smaller than the diameter of the bore 16. While the slot 18 is described as having a width generally smaller than the diameter of the bore 16, it should be understood that the slot 18 could be of an equivalent diameter to that of the bore 16, and should be considered as part of the present invention.

Figure 4:
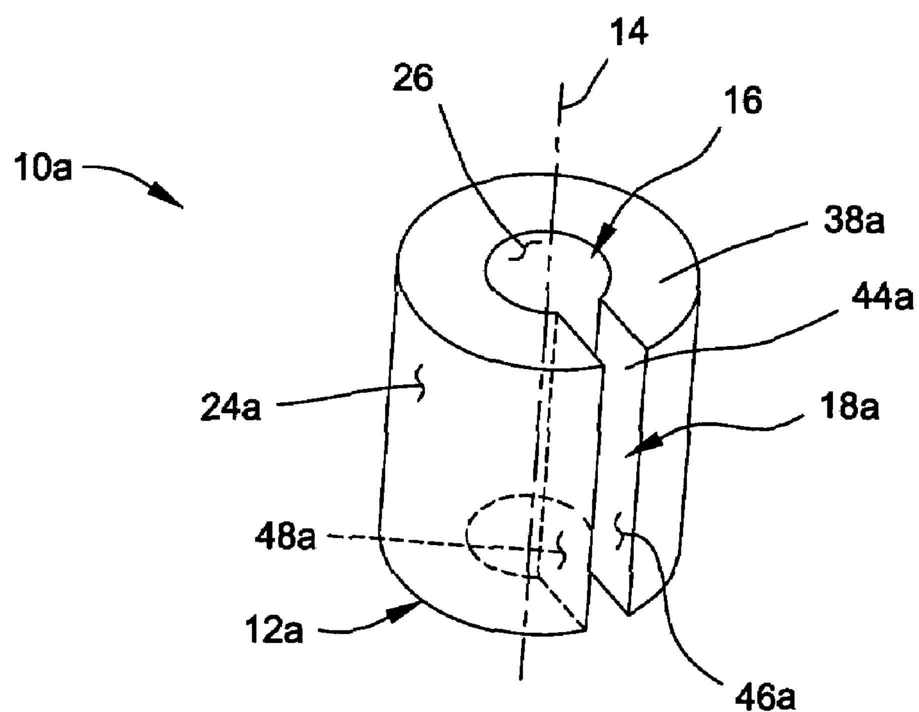
FIG. 4 is a perspective view of a second embodiment of a damper in accordance with the principles of the present invention.
Figure 5:
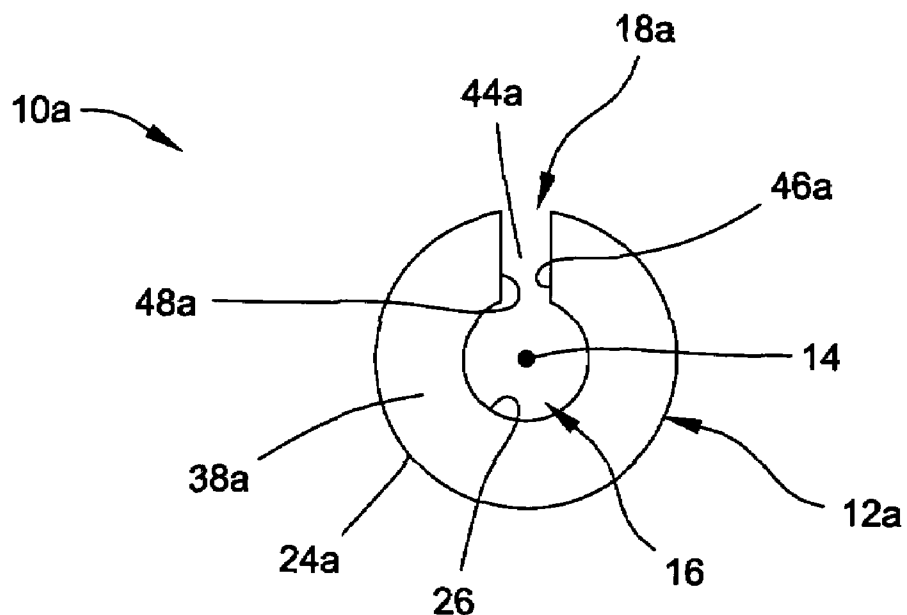
FIG. 5 is a plan view of the damper of FIG. 4.

With particular reference to FIGS. 4 and 5, a second embodiment of the mass damper 10*a* is shown having a main body 12*a*, a longitudinal axis 14, a bore 16, and a slot 18*a*. In view of the substantial similarity in structure and function of the components associated with the mass damper 10 of FIGS. 1–3 with respect to the mass damper 10*a*, like reference numerals are used hereinafter and in the drawings to identify like components while like reference numerals containing letter extensions are used to identify those components that have been modified.

The main body 12*a* comprises a generally cylindrical shape and includes a bore 16, an outer surface 24*a*, and an inner surface 26. The bore 16 extends along the longitudinal axis 14 and extends between a first and second end 20, 22 of the main body 12*a*.

The slot 18*a* is formed in the main body 12*a* along the longitudinal axis 14 and extends generally between the outer surface 24*a* and inner surface 26. In this regard, the slot 18*a* is operable to create an opening 44*a* to the bore 16. As can be appreciated, the opening 44*a* creates a first and second walled surface 46*a*, 48*a* formed in a wall 38*a* of the main body 12*a*. The first and second walled surfaces 46*a*, 48*a* are formed parallel to the longitudinal axis 14 of the main body 12*a* and extend from the outer surface 24*a* to the inner surface 26. In this regard, the width of the slot 18*a* is generally smaller than a diameter of the bore 16, whereby the width is measured between the first walled surface 46*a* and the second walled surface 48*a*. While the slot 18*a* is described as having a width generally smaller than the diameter of the bore 16, it should be understood that the slot 18*a* could be of an equivalent diameter to that of the bore 16, and should be considered as part of the present invention.

Figure 6:
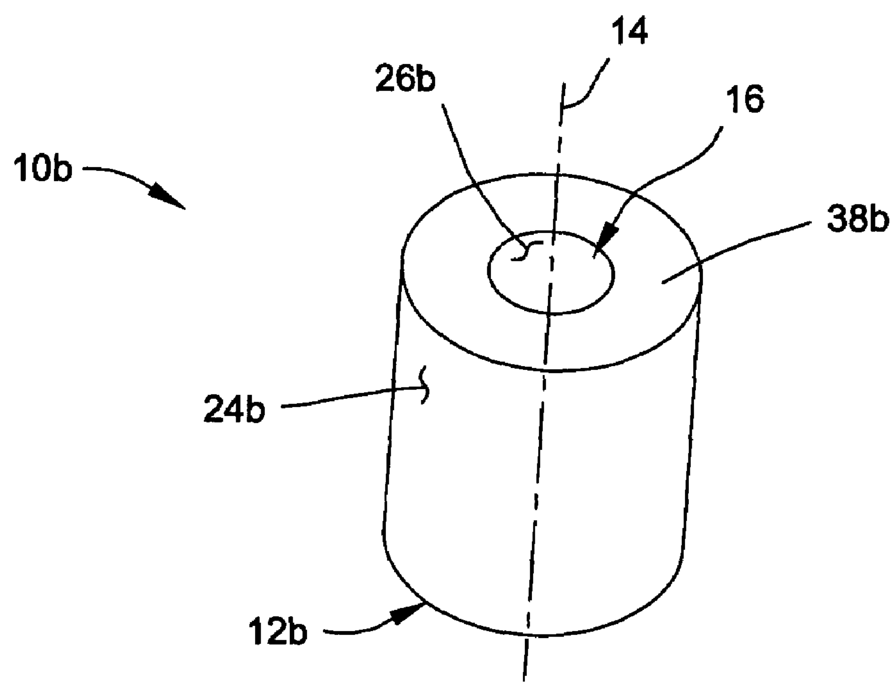
FIG. 6 is a perspective view of a third embodiment of a damper in a accordance with the principles of the present invention.
Figure 7:
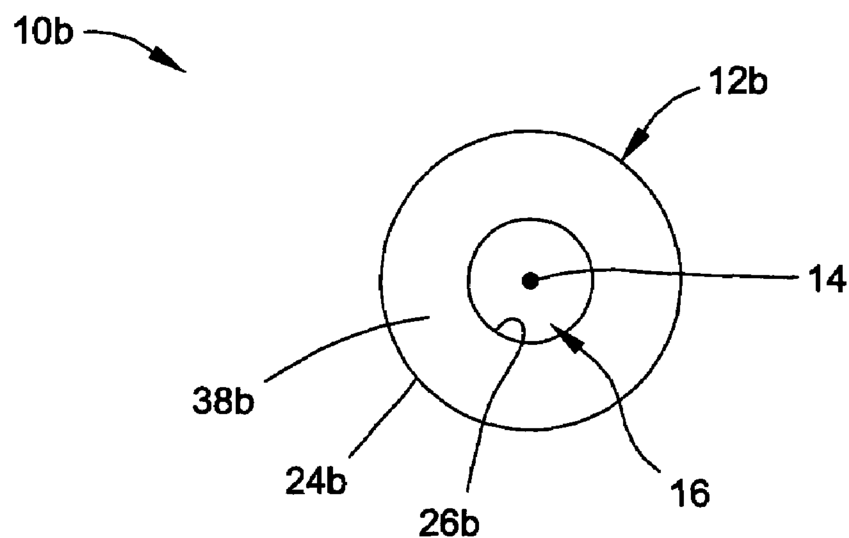
FIG. 7 is a plan view of the damper of FIG. 6.

With particular reference to FIGS. 6 and 7, a third embodiment of the mass damper 10*b* is shown having a main body 12*b*, a longitudinal axis 14, and a bore 16. In view of the substantial similarity in structure and function of the components associated with the mass damper 10 with respect to the mass damper 10*b*, like reference numerals are used hereinafter and in the drawings to identify like components while like reference numerals containing letter extensions are used to identify those components that have been modified.

The main body 12*b* of the mass damper 10*b* includes an outer surface 24*b* and an inner surface 26*b*, whereby the wall 38*b* of the main body 12*b* is defined therebetween. The bore 16 extends the length of the main body 12*b* and is formed along the longitudinal axis 14 such that the main body 12*b* forms a closed thick-walled body, here a cylinder, as shown in FIGS. 6–7.

With particular reference to FIGS. 1–2, the operation of the mass damper 10 will be described in detail. In view of the substantial similarity and function between the mass damper 10 with the mass damper 10*a*, a detailed description of the mass damper 10*a* is foregone.

The mass damper 10 is operable to absorb a vibrational force exerted on a flexible member, such as a power steering hose 50. The power steering hose 50 includes an elongate tubular member 52 formed from a suitable flexible material such as rubber or the like and having a flexible outer wall 58 and a bore 60 extending along its length. The overall length of the hose 50 is defined between first and second ends 54, 56.

Each of the first and second ends 54, 56 includes a first and second fastening element 62, 64 for attachment to a fluid system such as a power steering system (not shown). Each fastening element 62, 64 includes a central opening 66, 68 that is continuous with bore 60 to fluidly and sealingly connect bore 60 with the fluid system.

The mass damper 10 is attached to the tubular member 52 of the power steering hose 50 at a predetermined location to prevent noise caused by vibrational forces exerted on the hose 50. The location of the mass damper 10 along the tubular member 52 is specific to each application and is dependent on the type of hose 50 (diameter, material characteristics, wall thickness), length of the hose 50, and the forces exerted thereon (magnitude, direction, frequency, internal vs. external).

The mass dampers 10, 10*a* are attached to the hose 50 generally at the bore 16 of the main body 12. Specifically, a length of the tubular member 52 is compressed such that the tubular member 52 of the hose 50 can pass though the generally smaller opening 44 of the slot 18. Specifically, a compressive force is applied to the flexible outer wall 58 such that its profile generally assumes a slightly smaller width than that of the slot 18. Once the hose 50 is sufficiently compressed, the hose 50 is inserted through the slot 18 and into the bore 16 of the main body 12.

Once the tubular member 52 of the hose 50 is disposed within the bore 16, the compressive force exerted on the hose 50 is released, thereby allowing the hose 50 to once again assume its tubular or cylindrical shape. As can be appreciated, the hose 50 will naturally assume its original cylindrical shape once the compressive force exerted on the flexible outer wall 58 is released due to the nature of the flexible material of the hose 50.

Mass damper **10*b*, lacking the gap 18 found in mass dampers 10, 10*a*, clearly cannot be installed on the tubular member 52 in the same manner as dampers 10, 10*a*. Mass damper 10*b*, therefore, is generally of a two-piece construction, such as two semi-cylindrical sections (not shown) that are joined around tubular member 52 so that tubular member 52 occupies bore 16. The two semi-cylinder sections are then secured to each other such as by pins, bolts, bands or snaps, to form a solid thick-walled cylinder closely surrounding tubular member 52**.

In an alternative manner of installing the damper **10*b* on the hose 50, one of the first or second ends 62, 64 of the hose 50 is inserted into the bore 16 of the main body 12*b* and mass damper 10*b* is moved long the length of the hose 50 until it is properly positioned thereon. As can be appreciated, the flexible outer wall 58 is operable to engage the bore 16 of the main body 12*b* and hold the mass damper 10*b* in a position along the length of the hose 50**.

The hose 50 includes an outer diameter, which is generally larger than the inner diameter of the bore 16. In this regard, the mass damper 10 is effectively held in a predetermined position on the hose 50 between the first and second ends 54, 56 due to a force exerted by the flexible wall 58 on the inner surface 26 of the bore 16. As previously discussed, the specific location of the mass damper 10 along the tubular member 52 of the hose 50 is determined by the material of the hose 50, length of the hose 50, and forces exerted on the system.

In any of the foregoing embodiments, the relative position of the mass damper 10, **10*a*, 10*b* along a length of the hose 50 is governed by first determining the vibrational forces exerted on the hose 50 and is positioned such that the damper effectively reduces vibrational noise. Vibrational noise is created when the hose 50 experiences external vibrational forces. External vibrational forces are imparted on the system generally at the first and/or second fastening elements 62, 64 as well as forces applied directly to the hose 50. The mass damper 10 is operable to absorb such vibrational forces to prevent vibrational noise caused by slight movement of the hose 50. As previously discussed, the exact location of the mass damper 10 along the hose 50 between the first and second ends 54, 56 is generally a function of the flexible material used in the formation of the tubular member 52 and the overall length of the hose 50**.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A power steering hose comprising:

a hose member having an outer surface extending between a first end and a second end of the hose;

a damper disposed on said outer surface of said hose member generally between said first and second ends and adjustably positionable along a longitudinal axis of the hose member therebetween, said damper comprising:

a moveable cylindrical main body having a longitudinal axis; and a bore formed in said main body along said longitudinal axis. said bore operable to abuttingly receive said outer surface of said hose member, said main body uncoupled to any surface other than said outer surface, to thereby dampen vibrational forces acting on the power steering hose.

2. The power steering hose of claim 1 wherein said main body further includes a slot formed along said longitudinal axis, said slot extending from an outer surface of said main body and terminating at said bore.

3. The power steering hose of claim 2 wherein a width of said slot is generally smaller than a diameter of said bore.

4. The power steering hose of claim 1 wherein said main body includes a planar surface formed thereon.

5. The power steering hose of claim 4 wherein a slot is formed in said planar surface, said slot extending from said planar surface and terminating at said bore.

6. The power steering hose of claim 5 wherein a width of said slot is generally smaller than a diameter of said bore.

7. The power steering hose of claim 1 wherein said hose member is formed from a flexible material, said flexible material operable to engage said bore to position said main body relative to said hose member.

8. The power steering hose of claim 1 wherein said main body is formed from a rigid material.

9. The power steering hose of claim 1 wherein said bore comprises an inner diameter which is smaller than an outer diameter of said hose.

10. The power steering hose of claim 1 wherein said hose has an outer diameter approximately equal to an inner diameter of said bore, said bore operable to matingly receive said hose.

11. The power steering hose of claim 1, further comprising a slot formed in said main body between an outer surface of said main body and said bore, said slot operable to provide clearance for said hose member to engage said bore, wherein said hose has an outer diameter greater than a width of said slot.

12. The power steering hose of claim 11 wherein said hose is made from a flexible material, said flexible material operable to allow said hose to pass through said slot and engage said bore.

13. A method of dampening vibrational forces acting upon a power steering hose, the method comprising:

forming a power steering hose from a flexible material, said power steering hose having an outer surface extending between a first and second end of the hose;

providing a mass damper adjustably positionable on the outer surface of the hose along a longitudinal axis thereof between the first and second ends comprising a bore and a longitudinal slot;

compressing a section of said power steering hose, said compressed section generally equivalent in length to said longitudinal slot;

passing said compressed section through said slot and into said bore; and releasing said compressed section once said compressed section is axially aligned with said bore to secure said mass damper only to said outer surface of the power steering hose.

14. The method of claim 13 wherein said bore includes an inner diameter generally smaller than an outer diameter of said power steering hose.

15. The method of claim 13 wherein said longitudinal slot includes a width generally smaller than an outer diameter of said power steering hose.

16. The method of claim 13 further comprising forming a planar surface on an outer surface of said main body.

17. The method of claim 16 further comprising forming said slot in said planar surface.

* * * * *